May 31, 1966  JEAN-PIERRE BARRET  3,254,304
VOLTAGE CONTROLLED TEMPERATURE STABILIZED
VARIABLE GAIN CIRCUITS
Filed Aug. 23, 1961  6 Sheets-Sheet 1

INVENTOR
JEAN-PIERRE BARRET
BY Toulmin & Toulmin
ATTORNEYS

May 31, 1966  JEAN-PIERRE BARRET  3,254,304
VOLTAGE CONTROLLED TEMPERATURE STABILIZED
VARIABLE GAIN CIRCUITS
Filed Aug. 23, 1961  6 Sheets-Sheet 3

INVENTOR
JEAN-PIERRE BARRET
BY Toulmin & Toulmin
ATTORNEYS

United States Patent Office 3,254,304
Patented May 31, 1966

3,254,304
VOLTAGE CONTROLLED TEMPERATURE STABILIZED VARIABLE GAIN CIRCUITS
Jean-Pierre Barret, Marly-le-Roi, France, assignor to Institut Francais du Petrole, des Carburants et Lubrifiants, Rueil-Malmaison, France
Filed Aug. 23, 1961, Ser. No. 133,414
Claims priority, application France, Aug. 25, 1960, 836,918
11 Claims. (Cl. 330—24)

The present invention relates to attenuators substantially insensitive to temperature variations having an attenuation degree which is varied in accordance with the variations of a control voltage.

The present invention is more particularly concerned with logarithmic attenuators of this type which are advantageously used in combination with one or more amplifying devices so as to vary the gain of the system according to a predetermined law or to carry out an automatic gain control.

By logarithmic attenuator is meant an attenuator the gain of which varies exponentially with respect to the control voltage, i.e., having a gain the logarithm of which varies proportionally to said control voltage.

All types of diodes (vacuum diodes, semi-conducting diodes) may be advantageously used in said attenuators, either of the logarithmic type or not.

However, the semi-conducting diodes, and particularly silicon-junction diodes, are well adapted to be used in logarithmic attenuators in view of the fact that the current intensity passing therethrough, when they are used within a temperature range of from —15° C. to 60° C. and submitted to a voltage V of the order of ±1 volt, is substantially that given by the formula:

(1) $$i = Ke^{\beta V}$$

wherein K is a constant, e is the basis of the Naperian logarithms, V the voltage applied across the diode (hereinafter designated by the term polarizing voltage) and $\beta$ a constant which depends on the type of semi-conductor of which the diode is made.

From said formula the following relation, in Naperian logarithms, can be deduced:

(2) $$Li = c + \beta V$$

wherein $c = LK$, said formula expressing a linear relation between the polarizing voltage and the logarithm of the current intensity. Unfortunately, such a linearity of the relation between the polarizing voltage and the logarithm of the current intensity cannot be maintained in view of the fact that the value of $c$ cannot be kept constant when the temperature conditions (ambient temperature) are varying, the coefficient K of the diode being susceptible to variations within a very wide range when a temperature change occurs. It has been observed that temperature changes from —10° C. to +60° C. would result in a multiplication of the corresponding value of the current intensity $i$ by a factor of about 15.

To the contrary, it has been observed that within this temperature range the value of the coefficient $\beta$ remained substantially unchanged.

It is therefore an object of the present invention to provide an attenuator the gain of which depends on a controlling voltage and is substantially independent from the ambient temperature changes, within a wide range of, for instance, from —15° to +60° C.

It is another object of this invention to provide an attenuator the gain of which varies according to a substantially exponential relation with respect to the control voltage, i.e., having a gain the logarithm of which is a linear function of the control voltage at least when the latter is varied within a small range of values around zero (for example of from —1 volt to +1 volt), so as to ensure a variation of the gain in strict conformity with a pre-determined law, or to enlarge the working range in an automatic gain control system.

It is yet another object of this invention to provide a logarithmic attenuator wherein the linear function between the logarithm of the gain and the control voltage may be varied selectively.

It is a further object of the present invention to provide a combination of an attenuator with an amplifier comprising vacuum tubes or transistors, the total gain of which may be varied within very wide limits in a substantially exponential relation to the control voltage.

It is still a further object of this invention to provide an amplifying device the gain of which is substantially independent from temperature changes and varies exponentially with respect to a control voltage, said amplifying device being associated with feed-back means for automatic gain correction so that the open feed-back loop is substantially independent from said control voltage.

These and other objects as may be apparent from the following description and claims, are achieved by means of attenuating systems comprising essentially two groups of $2n$ diodes connected either in series or in parallel so that when the diodes of one group are conducting, those of the other group are substantially non-conducting and vice versa.

Such a system comprises a three-pole circuit to which is applied an alternating current corresponding to the signal which it is desired to attenuate, said three poles being respectively a neutral point at the common alternating potential of the junction line of the two groups of diodes and of the two ends of the chain formed by the two groups of diodes, and two other alternating points at the same potential being each on the junction line between the $n$th and the $n+1$th diode of each group. Two points at the same alternating potential means, two points connected through a capacitor which stops steady currents but transmits variations in potential.

A direct control voltage is applied between the terminals of each group of diodes. These two control voltages are equal but of opposite sign with respect to the neutral point of the D.C. source for control purposes in the case where the two groups of diodes are connected in series. The two control voltages may be possibly identical where the two groups of diodes are connected in parallel with one end of a group of diodes being possibly at the potential of the neutral point of the control D.C. source.

The three-pole system according to the present invention may be used in place of the three-pole circuits comprising two resistors having a common point, said common point and the two end points of said two resistors being the three poles.

In four-pole attenuating and/or amplifying systems structurally comprising three-pole circuits of the above-mentioned type and the transfer gain of which is expressed as a function of the ratio between the respective resistances of said two resistors, there may be advantageously used a three-pole circuit comprising diodes, according to the present invention, the attenuation degree of which is controlled by a voltage.

To the diodes there are applied polarizing voltages of low positive or negative values at which the current intensity passing through a diode varies exponentially with respect to the polarizing voltage applied thereto. Such a range of low values of the polarizing voltage, around zero, is applicable in the case of the attenuators according to the present invention, which constitutes a valuable advantage of the latter compared with the conventional attenuators comprising diodes which require the use of higher voltages at which the relation between the logarithm of the gain and the control voltage is no longer linear.

The invention will be further explained more in detail with particular reference to the accompanying drawings, wherein FIGURE 1 is a schematic diagram of a four-pole transfer circuit comprising a three-pole circuit consisting of two resistors having a common point;

FIGURE 2 schematically represents a three-pole circuit according to the invention having two groups of diodes connected in series;

Figure 9:
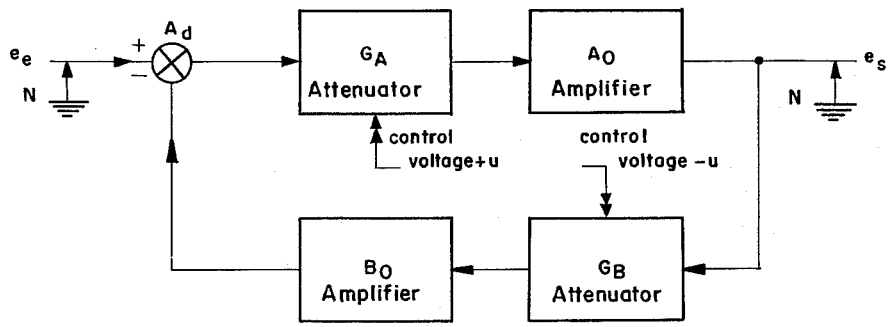
Figure 6:
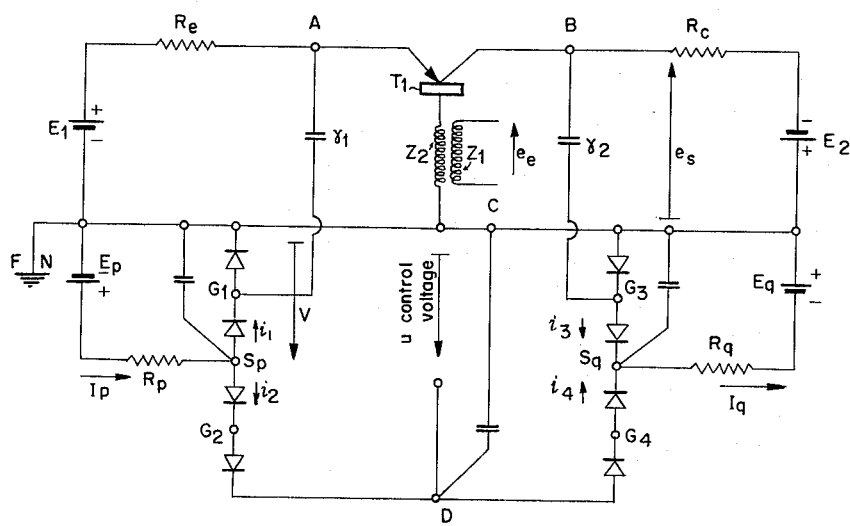
Figure 4:
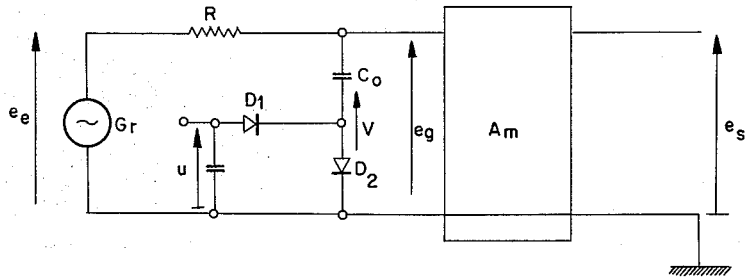
Figure 5:
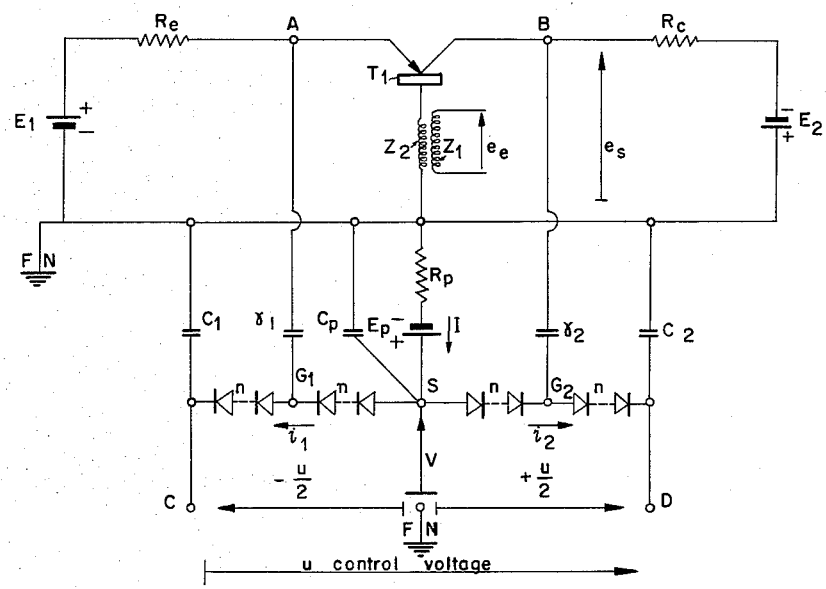
Figure 7:
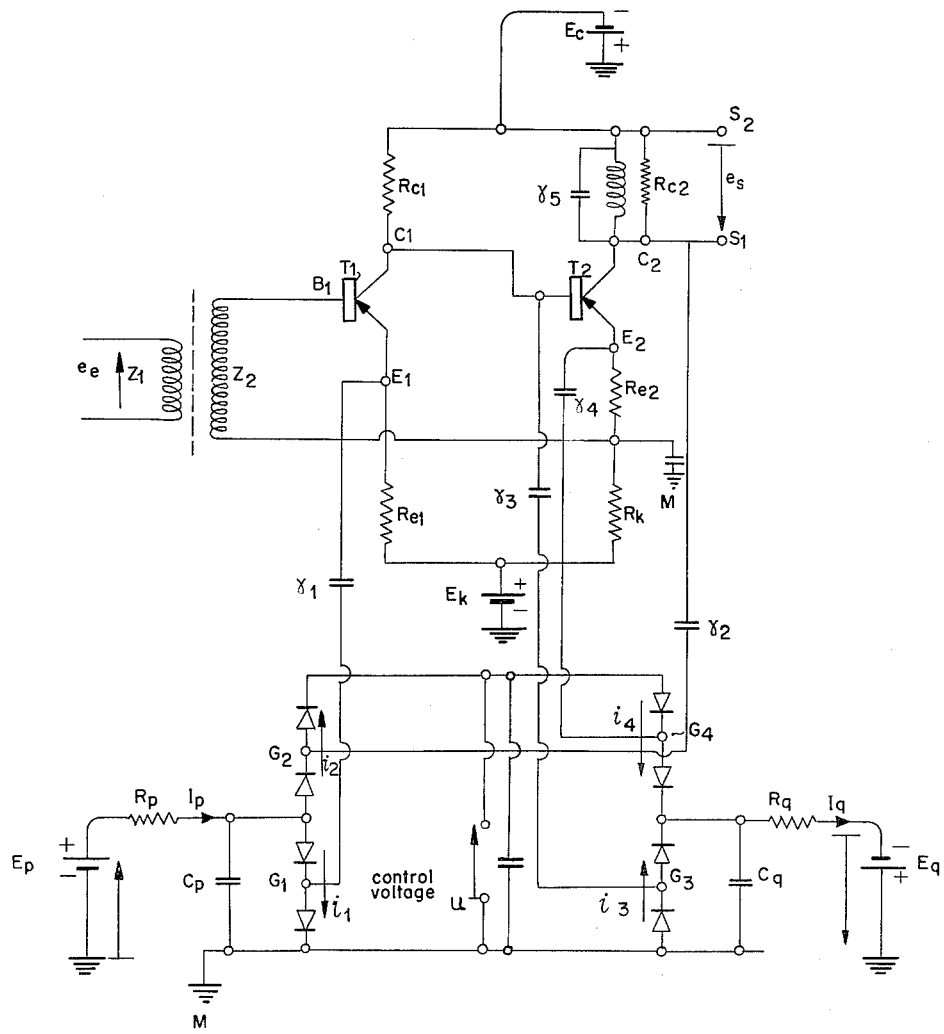
Figure 8:
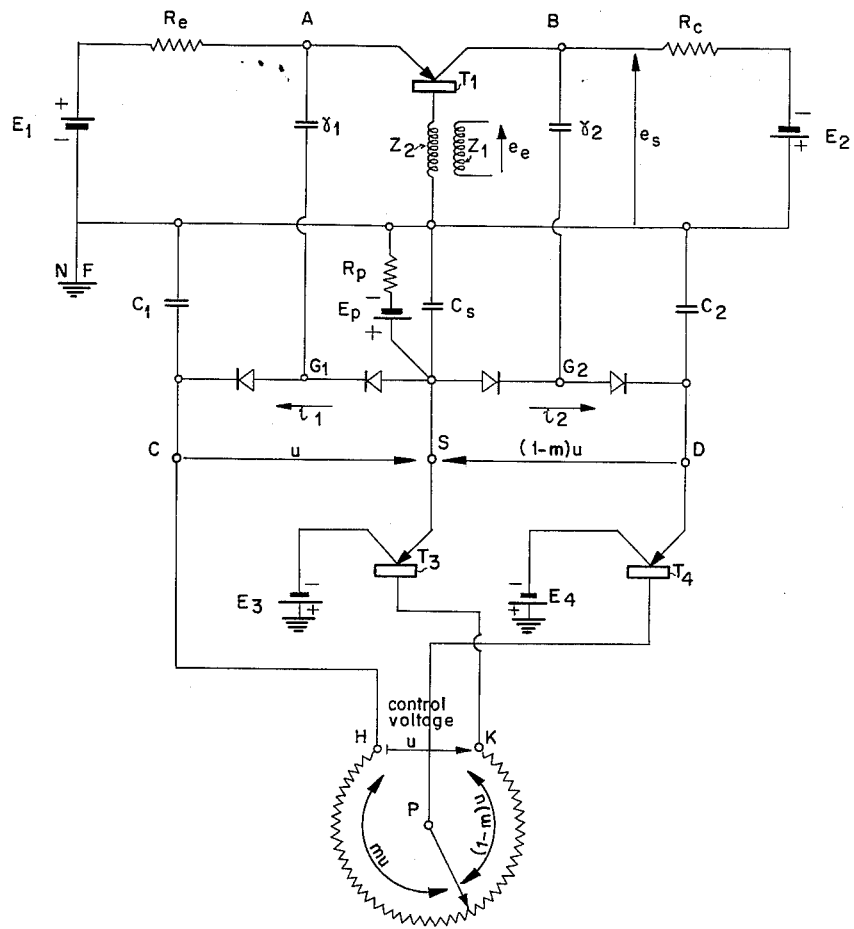

FIGURE 4 diagrammatically shows a conventional prior art attenuator comprising diodes, the gain of which is controlled by a voltage;

FIGURE 5 illustrates one particular arrangement of a combined attenuator-amplifier according to the invention, comprising a chain of 4n-diodes connected in series;

FIGURE 6 illustrates another arrangement of a combined attenuator-amplifier according to the present invention comprising two chains each of which consists of two groups of diodes connected in series, said two groups being inversely oriented with respect to each other and each chain being submitted to a separate polarizing voltage;

FIGURE 7 shows still another arrangement of a combined attenuator-amplifier of the type shown in FIGURE 6 but comprising two amplification stages;

FIGURE 8 shows a further arrangement of a combined attenuator-amplifier comprising means for adjusting selectively the linear relation between the logarithm of the gain and the control voltage; and FIGURE 9 illustrates the use of a feed-back loop in an amplifying circuit.

In the various drawings the same elements are designated by the same reference symbols. The attenuators according to the invention and the method for operating the same will now be described with reference to the above-mentioned drawings.

Figure 1:
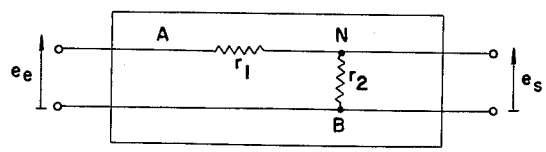

The gain of the transfer circuit shown in FIGURE 1 is given by the formula:

(3) $$G=\frac{r_2}{r_1+r_2}=\frac{1}{1+r_1/r_2}$$

wherein only the ratio of the resistance values of $r_1$ and $r_2$ and not said values themselves are taken into consideration.

Figure 2:
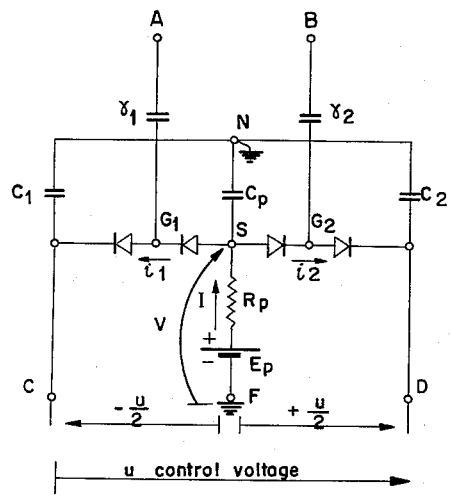

Such a circuit thus complies with the required conditions for being replaced by a three-pole circuit according to the invention, providing means for controlling the gain by a voltage, such as, for instance, a circuit of the type shown in FIGURE 2.

According to FIGURE 1 the alternating signal to be attenuated may be applied between points A and B and the output signal picked up between points N and B.

The groups of diodes $G_1$ and $G_2$ are traversed continuously by direct currents $i_1$ and $i_2$ respectively, of which the sum is equal to the current I produced by the battery of electromotive force $E_p$ against the polarization resistance $R_p$ where $E_p$ and $R_p$ are chosen high enough to make I substantially constant.

If control voltage $u$ having the polarity of FIGURE 2, namely $V_D-V_C=+u$ is applied, current $i_1$ will be greater than the current $i_2=I-i_1$, current $i_2$ not being zero because $u$ is much less than $E_p$ by hypothesis.

The effect of attenuation of the signal $e_e$ between points A and B, where $e_e$ is shown in FIGURE 1 and A and B are shown in FIGURES 1 and 2, is accomplished by shunting between points A and N and the points B and N respectively by the groups of diodes $G_1$ and $G_2$.

The effect of this shunting, namely the degree of attenuation, will become lower as the intensity $i_1$ is greater than the intensity $i_2$.

According to this invention, it is possible to increase the ratio $i_1/i_2$ by increasing the control voltage $u$, and to do this in a manner practically independent of temperature.

The gain of this system is given by the formula:

(4) $$G=\frac{1}{1+rd_1/rd_2}$$

wherein $rd_1$ and $rd_2$ represent the respective differential resistances of the two groups of diodes. According to Formula 1 above, there may be written:

(5) $$rd_1/rd_2=\frac{1}{2\beta i_1}:\frac{1}{2\beta i_2}$$
$$=i_2/i_1$$
$$=\frac{K_2}{K_1}\frac{e^{+\beta/2\left(V+\frac{u}{2}\right)}}{e^{+\beta/2\left(V-\frac{u}{2}\right)}}$$
$$=\frac{K_2}{K_1}e^{\frac{+\beta}{2}u}$$

wherein V represents the voltage between points S and F, $i_1$ and $i_2$ are the respective current intensities passing through the groups of diodes $G_1$ and $G_2$ and $u$ is the control voltage applied between points C and D. The coefficient $\beta$ has been proven to be substantially indpendent from the variations of the ambient temperature and the values of the coefficients $K_1$ and $K_2$ are varying substantially in the same proportion as a function of the temperature changes, so that the gain of the system is substantially independent from the temperature variations.

The notation "differential resistance" of a diode is derived from the analogy with fixed classical resistance by application of the relation $V=RI$ where R can be expressed as $V/I$.

Starting from an initial value $r_0$ of the resistance of the diode for a current intensity $i_0$, the diode will be characterized by a differential resistance $rd$ defined as the quotient of the voltage change between its terminals by the corresponding change of current intensity, or $rd=dV/di$, which in the case of diodes of groups $G_1$ and $G_2$ gives the relations—

$$rd_1=d\frac{(V_A-V_N)}{di_1}=d\frac{(V_{G_1}-V_N)}{di_1}$$

and $$rd_2=d\frac{(V_B-V_N)}{di_2}=d\frac{(V_{G_2}-V_N)}{di_2}$$

According to one of the preferred embodiments of the present invention the attenuating circuit is used in combination with amplifying means comprising one or more vacuum tubes and/or transistors, so as to realize a system the gain of which is an exponential function of the control voltage within a very wide range of the gain values.

Many devices of this type may be achieved according to this invention by association of one or more three-pole circuits of the above-described type to one or more transistors or vacuum tubes according to the number of amplification stages of the system.

Figure 3:
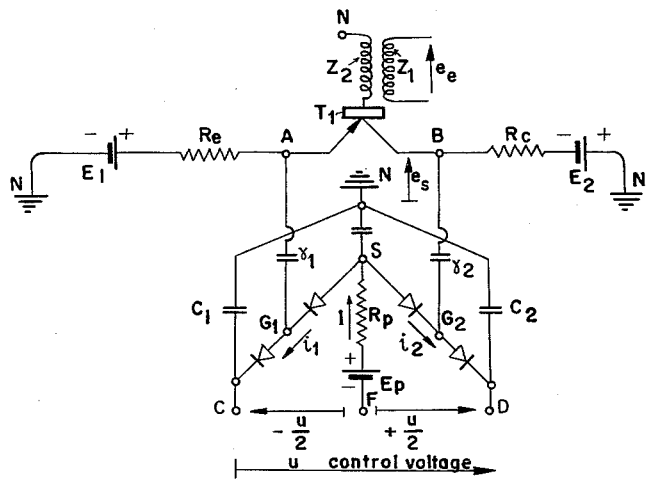
FIGURE 3 shows an attenuator circuit according to the present invention, in combination with amplifying means.

FIGURE 3 illustrates, by way of example, an attenuating-amplifying system according to the present invention wherein the attenuation or amplification degree of the input signal may be adjusted to the desired value by varying the control voltage, without substantial disturbance as a result of temperature changes.

This system comprises a transistor $T_1$ to the base of which is applied the input signal, for instance by induction between the windings $Z_1$ and $Z_2$ of a transformer, and having its emitter and collector fed with direct current through resistors $R_e$ and $R_c$, respectively.

Each of these resistors is shunted, with respect to the alternating current, by two similarly oriented diodes of the diode groups $G_1$ and $G_2$, respectively. The impedance of the diodes depends on the voltage $u$ which is applied between the two ends of the diode chain formed by the two diode groups $G_1$ and $G_2$, in the form of two voltages of $$+\frac{u}{2} \text{ and} -\frac{u}{2}$$

applied respectively between the neutral point of the current source $E_p$ and each end of the diode chain. The variations of the voltage $u$ correspond to the attenuation or amplification law which it is desired to apply.

The chain of diodes is fed with direct current through the resistor $R_p$, by means of the D.C. source $E_p$ which may also be that which feeds the transistor $T_1$ (source $E_1$).

Each group comprises an even number of diodes (which number is the same for the two groups). One of the terminals of the chain of diodes may be grounded but this is not necessary since the terminals of the chain may also be isolated from the ground by means of capacitors of high capacity (condensers $C_1$ and $C_2$ in FIGURE 3).

The respective shunting circuits of the emitter and the collector each comprises a capacitor ($\gamma_1$ and $\gamma_2$, respectively) isolating, with respect to the direct current, the chain of diodes from the current source $E_1$ but giving passage to the signal being in the form of alternating current.

These shunting circuits are connected respectively between the $n$th and the $n+1$th diodes of each of the two groups of $G_1$ and $G_2$ of $2n$ diodes.

The groups of diodes $G_1$ and $G_2$ are traversed continuously by direct currents $i_1$ and $i_2$ respectively, of which the sum is equal to the current $I$ produced by the battery of electromotive force $E_p$ against the polarization resistance $R_p$ where $E_p$ and $R_p$ are chosen high enough to make $I$ substantially constant.

If control voltage $u$ having the polarity of FIGURE 3, namely $V_D - V_C = +u$ is applied, it appears that the current $i_1$ will be greater than the current $i_2 = I - i_1$, this current $i_2$ not being zero however because $u$ is much less than $E_p$ by hypothesis.

The effect of attenuation of the signal $e_e$ applied by means of coils $Z_1$ and $Z_2$ to the base of the transistor $T_1$, is accomplished by the shunting of the emitter and of the collector of this transistor between points A and N and the points B and N respectively, by the groups of diodes $G_1$ and $G_2$.

It appears immediately that the effect of this shunting, namely the degree of attenuation, will become lower as the intensity $i_1$ is greater than the intensity $i_2$.

Now according to this invention, it is possible to increase the ratio $i_1/i_2$ by increasing the control voltage $u$, and to do this in a manner practically independent of the temperature.

Figure 3A:
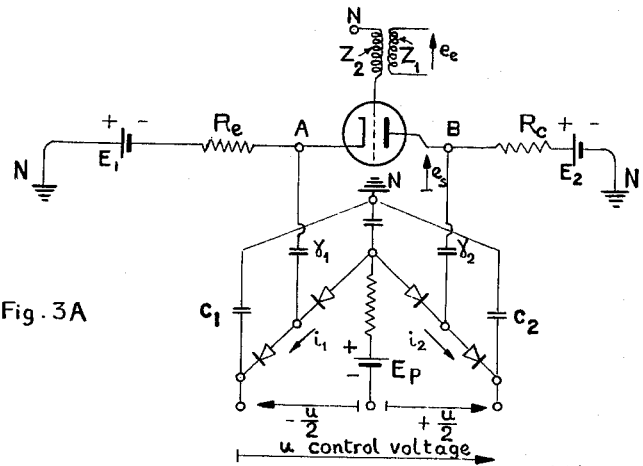
FIGURE 3A is an alternative circuit of FIGURE 3 showing a vacuum triode substituted for the transistor $T_1$.

In the different modifications of an attenuator-amplifier which have been illustrated, it will be obviously possible, as shown by FIGURE 3A, to replace the transistors by vacuum tubes in a known manner, the vacuum tubes having a control grid, a cathode and an anode or plate, with for example the points of the circuit that are connected to the base of the transistor in the transistor circuits, then connected to the grid of the tube, those connected to the emitter of the transistor then connected to the cathode of the vacuum tube, and those connected to the collector of the transistor then connected to the plate of the tube.

The circuits corresponding to the arrangement shown in FIGURE 3 offer not only the above-mentioned advantage of having a gain substantially independent of the ambient temperature variations, but also the further advantage of providing means for so varying this gain that, within a very wide range of values, its logarithm is kept in substantially linear relation to the control voltage, as shown by the following simplified calculation (applicable to the arrangement shown in FIGURE 3).

The gain of the system is given by the formula:

(6)
$$G = \alpha \cdot \frac{\frac{R_c r d_2}{R_c + r d_2}}{\frac{R_e r d_1}{R_e + r d_1} + r_e - (1-\alpha)(r_s + r_b)}$$

wherein $\alpha$ is the gain in current of the transistor $T_1$ (for a good transistor the value of $\alpha$ is close to 1);
$rd_1$ is the differential resistance of the group of diodes $G_1$, between point A and the neutral point for alternating current (N);
$rd_2$ is the differential resistance of the group of diodes $G_2$, between point B and the neutral point for alternating current (N);
$R_c$ is the load resistance of the collector;
$R_e$ is the load resistance of the emitter;
$r_e$ is the internal resistance of the emitter;
$r_s$ is the internal resistance of the source for applying the input signal to the base of the transistor (load resistance of the base), and
$r_b$ is the resistance of the base of the transistor.

By conveniently selecting identical resistors and diodes so that $R_c = R_e = R$ and $K_1 = K_2 = K$ and putting down $r_e - (1-\alpha)(r_s + r_b) = r$ there may be written:

(7)
$$G = \alpha \cdot \frac{rd_2}{rd_1} \cdot \frac{\frac{1}{1+rd_2/R}}{\frac{1}{1+rd_1/R} + \frac{1}{rd_1}}$$

The respective values of $rd_1$ and $rd_2$ are:

(8)
$$rd_1 = \frac{1}{2\beta i_1} \text{ wherein } i = Ke^{\frac{\beta}{2}\left(V+\frac{u}{2}\right)}$$

(9)
$$rd_2 = \frac{1}{2\beta i_2} \text{ wherein } i_2 = Ke^{\frac{\beta}{2}\left(V-\frac{u}{2}\right)}$$

I being the intensity of the current supplied to the two groups of diodes by the source at the potential $E_p$, which is selected of a high value as compared with the control voltage $u$ so as to make $I$ independent therefrom, there may be written the equation:

$$I = i_1 + i_2 = Ke^{\frac{\beta}{2}V}\left(e^{\frac{\beta u}{4}} + e^{-\frac{\beta u}{4}}\right)$$

from which are deduced the following relations:

$$i_1 = \frac{I}{e^{\frac{\beta u}{4}} + e^{-\frac{\beta u}{4}}} \cdot e^{\frac{\beta u}{4}} = \frac{I}{1+e^{-\frac{\beta u}{2}}}$$

and $$i_2 = \frac{I}{e^{\frac{\beta u}{4}} + e^{-\frac{\beta u}{4}}} \cdot e^{-\frac{\beta u}{4}} = \frac{I}{1+e^{\frac{\beta u}{2}}}$$

By putting said values of $i_1$ and $i_2$ into the Equations 8 and 9 there are obtained:

(10)
$$rd_1 = \frac{1}{2\beta I}\left(1+e^{-\frac{\beta u}{2}}\right)$$

and

(11)
$$rd_2 = \frac{1}{2\beta I}\left(1+e^{+\frac{\beta u}{2}}\right)$$

The term $r$, being very low as compared with $rd_1$, may be omitted in a simplified calculation so that the gain is given by the formula:

$$G = \alpha \cdot \frac{rd_2}{rd_1} \cdot \frac{1+\frac{rd_1}{R}}{1+\frac{rd_2}{R}} = \alpha e^{\frac{\beta u}{2}} \frac{1+\frac{1+e^{-\frac{\beta u}{2}}}{2\beta RI}}{1+\frac{1+e^{+\frac{\beta u}{2}}}{2\beta RI}}$$

$2\beta RI$ being designated by A, $$\frac{1}{1+A}$$

by B and the Naperian logarithm of G by $g$, there may be written:

(12)
$$g = L\alpha + \frac{\beta u}{2} + L\left(1+A+e^{-\frac{\beta u}{2}}\right) - L\left(1+A+e^{+\frac{\beta u}{2}}\right) = L\alpha + \frac{\beta u}{2} + L\left(1+Be^{-\frac{\beta u}{2}}\right) - L\left(1+Be^{+\frac{\beta u}{2}}\right)$$

B being considerably lower than 1, it may be seen from the above formula that for a high positive value of $u$ the term $$L\left(1+Be^{-\frac{\beta u}{2}}\right)$$

is close to zero and the term $$L\left(1+Be^{+\frac{\beta u}{2}}\right)$$

is very close to $$L\left(Be^{+\frac{\beta u}{2}}\right) = LB^{+\frac{\beta u}{2}}$$

In such a case the value of $g$ tends to the asymptotic limit of $L\alpha - LB$.

Similarly, for a high negative value of $u$ $g$ tends to the asymptotic limit of $L\alpha + LB$.

It is hereinafter demonstrated that, between these two asymptotic values, the representative curve of $g$ as a function of $u$ only has one point of inflexion for the value $u=0$, which constitutes a favorable condition for a good linearity of the $g$ function within a range comprising low positive and negative values of $u$ (i.e., within the range around zero).

From the Equation 12 there may be deduced:

(13)
$$\frac{dg}{du} = \frac{\beta}{2} - \frac{\beta}{2} \cdot B \cdot \frac{e^{-\frac{\beta u}{2}}}{1+Be^{-\frac{\beta u}{2}}} - \frac{\beta}{2} \cdot \frac{Be^{\frac{\beta u}{2}}}{1+Be^{\frac{\beta u}{2}}}$$

and

(14)
$$\frac{d^2g}{du^2} = \frac{\beta^2 B}{4}\left[\frac{e^{-\frac{\beta u}{2}}}{1+Be^{-\frac{\beta u}{2}}} - \frac{Be^{-\beta u}}{\left(1+Be^{-\frac{\beta u}{2}}\right)^2} - \frac{e^{\frac{\beta u}{2}}}{1+Be^{\frac{\beta u}{2}}} + \frac{Be^{\beta u}}{\left(1+Be^{\frac{\beta u}{2}}\right)^2}\right]$$

From the relation (14) it is seen that $$\frac{d^2g}{du^2} = 0$$

for $u=0$, which proves that there does exist a point of inflexion of the representative curve of $g$, corresponding to the value $u=0$.

The angular coefficient of the tangent to the representative curve of $g$, at said point of inflexion, is:

$$\frac{dg}{du} \text{ (for } u=0\text{)} = \frac{\beta}{2} - \frac{2\beta}{2}B \cdot \frac{1}{1+B} = \frac{\beta}{2}\left(1 - \frac{2B}{1+B}\right) = \frac{\beta}{2} \cdot \frac{A}{2+A}$$

Z being used to designate the term $e^{\beta u/2}$, there may be written:

$$\frac{d^2g}{du^2} = \frac{\beta^2}{4}B\left[\frac{\frac{1}{Z}}{1+\frac{B}{Z}} - \frac{\frac{B}{Z^2}}{\left(1+\frac{B}{Z}\right)^2} - \frac{Z}{1+BZ} + \frac{BZ^2}{(1+BZ)^2}\right]$$

$$= \frac{\beta^2}{4}B\left[\frac{1}{Z\left(+\frac{B}{Z}\right)^2} - \frac{Z}{(1+BZ)^2}\right]$$

$$= \frac{\beta^2}{4}B\frac{(1-B^2)(1-Z^2)}{Z\left(1+\frac{B}{Z}\right)^2(1+BZ)^2}$$

Since B has a value considerably lower than 1, it may be seen from the above formula that $$\frac{d^2g}{du^2}$$

is always positive for $Z>1$ and negative for $Z<1$, which proves that the representative curve of $g$ has only one point of inflexion.

For purposes of comparison, FIGURE 4 shows a conventional arrangement of an attenuator the gain of which is controlled by a voltage and which may be used, for instance, in amplifiers for seismic signals. The alternating voltage $e_e$ of high frequency to be attenuated is supplied in $G_r$ to the input circuit of the amplifier $Am$ (having a gain $G_0$ in the case of an infinite input impedance) comprising a resistor R, two diodes $D_1$ and $D_2$ connected in series and fed with a control voltage $u$, and a capacitor $C_0$, placed between the resistor R and the diodes, so as to avoid the passage of the direct current resulting from the voltage $u$.

The two diodes $D_1$ and $D_2$ being selected as identical, the gain, at the output of the amplifier $Am$, will be:

$$G = \frac{e_s}{e_e} = \frac{e_s}{e_g} \cdot \frac{e_g}{e_e} = G_0 \cdot \frac{rd/2}{R+rd/2}$$

wherein $rd$ is the differential resistance of each diode. According to the Formula 1 above:

$$rd = \frac{1}{\beta i}$$

By selecting the resistance R of such a high value that $rd/2$ is negligible as compared with R, the gain is given by the formula:

$$G = G_0 \cdot \frac{rd}{2R} = G_0 \frac{1}{2R\beta i}$$

From $i = Ke^{\beta V} = Ke^{\beta u/2}$ wherein $$V = \frac{u}{2}$$

there may be deduced the equation:

$$G = \frac{G_0}{2RK\beta} \cdot e^{-\frac{\beta u}{2}}$$

showing that the gain depends on the coefficient K of the diodes, which coefficient is known to vary within a wide range as a function of the ambient temperature, as already stated above.

The arrangement illustrated in FIGURE 5 is substantially the same as that shown in FIGURE 3 except that each of the two groups of diodes comprises $2n$ diodes in order to facilitate, due to the averaging effect, the selection of groups of diodes the coefficient K of which is substantially identical.

As a matter of fact, the coefficients of the diodes are not strictly identical and it may be assumed that their values are all more or less close to a mean value, according to the law of great numbers. When using groups of $2n$ diodes, the greater $n$ is, the more easily the equality of the coefficients K of the two groups of diodes $G_1$ and $G_2$ is achieved.

The average value of K for a group of $n$ diodes will be $$Km = \frac{1}{n}\sum_{j=1}^{j=n} Kj$$

wherein $Kj$ is the coefficient of the $j^{th}$ diode of the group.

With a sufficiently high value of $n$ it will be easy to ascertain a second group of $n$ diodes having the same average coefficient $Km$ as the first group.

Moreover, the use of a high number of diodes connected in series offers the advantage of reducing the alternating voltage applied to each diode, whereas the total alternating voltage applied to each group is unchanged.

The diagram of FIGURE 6 illustrates the use, in combination, of two chains of diodes, each chain being part of a circuit similar to that shown in FIGURE 3, the first chain comprising the two groups $G_1$ and $G_2$ connected between the positive current source $E_p$ and the neutral point, and the second chain comprising the two groups $G_3$ and $G_4$ connected between the neutral point and the negative current source $E_q$.

The groups of diodes $G_1$ and $G_3$ are traversed continuously by direct currents $i_1$ and $i_3$ respectively.

If control voltage $\mu$ having the polarity of FIGURE 6 namely $V_D - V_C = +\mu$ is applied, it appears that the current $i_1$ will be greater than the current $i_3$, this current $i_3$ not being zero however because $|\mu|$ is much less than $|E_q|$ by hypothesis.

The effect of attenuation of the signal $e_e$ applied by means of coils $Z_1$ and $Z_2$ to the base of the transistor $T_1$, is accomplished by the shunting of the emitter and of the collector of this transistor between points A and N and the point B and N respectively, by the groups of diodes $G_1$ and $G_3$.

It appears immediately that the effect of this shunting, namely the degree of attenuation will become lower as the intensity $i_1$ is greater than the intensity $i_3$.

Now according to this invention, it is possible to increase the ratio $i_1/i_3$ by increasing the control voltage $\mu$, and to do this in a manner practically independent of the temperature.

It will be demonstrated hereinafter that the gain obtained by use of such an attenuating-amplifying system is substantially independent of the ambient temperature variations.

The currents $I_p$ and $I_q$ supplied by the sources $E_p$ and $E_q$ to each chain are shared between the two groups of the chain, thereby giving the relations:

(15) $$I_p = i_1 + i_2$$

and

(16) $$I_q = i_3 + i_4$$

wherein $i_1$, $i_2$, $i_3$ and $i_4$ respectively represent the current intensity passing through the groups of diodes $G_1$, $G_2$, $G_3$ and $G_4$.

The current intensities $i_1$ and $i_2$ have respectively the following values:

(17) $$i_1 = K_1 e^{\beta/2V}$$

(18) $$i_2 = K_2 e^{\beta/2(V-u)}$$

wherein V is the voltage supplied by the source of current $E_p$.

From the above relations (15), (17) and (18) there may be deduced the equation:

(19) $$I_p = i_1 \frac{K_2}{K_1} e^{-\frac{\beta u}{2}} + i_1 = i_2 + i_2 \frac{K_1}{K_2} e^{\frac{\beta u}{2}}$$

giving the following values of $i_1$ and $i_2$:

(20) $$i_1 = \frac{I_p}{1 + \frac{K_2}{K_1} e^{-\frac{\beta u}{2}}}$$

(21) $$i_2 = \frac{I_p}{1 + \frac{K_1}{K_2} e^{\frac{\beta u}{2}}}$$

which values are independent of V. Similarly, the values of $i_3$ and $i_4$ are:

(22) $$i_3 = \frac{I_q}{1 + \frac{K_4}{K_3} e^{-\frac{\beta u}{2}}}$$

(23) $$i_4 = \frac{I_q}{1 + \frac{K_3}{K_4} e^{\frac{\beta u}{2}}}$$

An approximate value of the gain in voltage may thus be calculated by use of the Formula 7 above wherein the following assumptions are made:

$\alpha = 1$, $r$ is very low as compared with the differential resistance of the diodes which, in turn, is very low as compared with the resistances $R_p$ and $R_q$. Said approximate value is the following:

(24)

$$G = \frac{rd_3}{rd_1} = \frac{i_1}{i_3} \cdot \frac{i_p}{i_q} = \frac{1 + \frac{K_4}{K_3} e^{\frac{\beta u}{2}}}{1 + \frac{K_2}{K_1} e^{-\frac{\beta u}{2}}} = \frac{I_p}{I_q} \cdot \frac{e^{-\frac{\beta u}{2}} + \frac{K_4}{K_3}}{1 + \frac{K_2}{K_1} e^{\frac{\beta u}{2}}}$$

By selecting the diodes of the groups $G_1$ and $G_2$ so that $K_1 = K_2$ and the diodes of the groups $G_3$ and $G_4$ so that $K_3 = K_4$, there may be written:

(25) $$G = \frac{I_p}{I_q} e^{\frac{\beta u}{2}}$$

showing that G is independent of the coefficients K and is therefore not susceptible to modification as a result of a change in the temperature conditions at which the apparatus may be used, the coefficient $\beta$ being substantially independent of the ambient temperature variations.

The gain is expressed in decibels by the following relation:

(26) $$NdB = 20 \log G = 20 \log \frac{I_p}{I_q} + 8.7 \frac{\beta u}{2}$$

It is apparent from this formula that the gain may be adjusted both as a function of the attenuation law which is expressed by the variations of the voltage $u$ (according to a predetermined logarithmic law or as a result of an automatic gain control) and as a function of the ratio $I_p/I_q$ which may be written in the following form:

$$\frac{I_p}{I_q} = \frac{E_p}{E_q} \cdot \frac{R_q}{R_p}$$

wherein $E_p$ and $E_q$ are the respective positive and negative potentials of the two sources of current and $R_p$ and $R_q$ the resistances through which said sources are supplying current to the two chains of diodes, respectively.

In the case where the potentials $E_p$ and $E_q$ are supplied by the same source, it may be seen from the above relation that any potential varition of this source will have no effect on the gain since the values of $E_p$ and $E_q$ will both vary in the same proportion.

The gain of the arrangement shown in FIGURE 6 is given by the general formula:

$$G = \frac{E_p}{E_q} \cdot \frac{R_q}{R_p} e^{\frac{\beta u}{2}}$$

According to this formula it is apparent that the gain may be caused to vary linearly by changing the value of $E_p$, according to a hyperbolic function, by changing the value of $E_q$ and according to an exponential function, by varying the value of $u$.

Accordingly, such as an attenuating system may be advantageously used for realizing an analog computer for effecting multiplications, divisions and exponential transformations.

The simplified arrangements of FIGURES 1 to 6, illustrating the attenuating system according to this invention, do not correspond in most cases with the devices which are to be used in practice since the wide range of the logarithmic attenuation thus obtained (a range of 100 decibels without any substantial divergence with respect to linearity) requires the combined use of amplifiers wherein the ratio between the noise level, brought down to the corresponding input value, and the maximal input level, exceeds the wider attenuation range, i.e., 100 decibels.

In such a case a single amplification stage is insufficient.

In order to further illustrate the various types of arrangements of the attenuating systems according to this invention, FIGURE 7 shows, by way of example, a diagram of one of the preferred means for connecting an attenuator according to the invention with a two-stage amplifier.

The attenuating-amplifying device corresponding to this diagram comprises two transistors $T_1$ and $T_2$ of low noise level, the amplifying stage being stabilized with respect to temperature by feed-back means. The first transistor $T_1$ acts like transistor $T_1$ of FIGURES 1 to 6. Its emitter circuit, comprising the resistor $Re_1$, is connected between the two diodes of the group $G_1$, through the capacitor $\gamma_1$ and its collector circuit, comprising the resistor $Rc_1$, is connected, through the circuit comprising the capacitor $\gamma_3$, between the two diodes of the group $G_3$.

The working of the first amplification stage is therefore identical with that of a single stage as hereabove described.

The working of the second amplification stage is similar to that of the first one. The emitter circuit of the second stage, comprising the resistor $Re_2$, connected with the resistance $R_k$ so as to lower the input current (the resistance $R_k$ providing means by negative reaction for stabilizing with respect to temperature the level of the polarizing voltage at which the amplifier works), is connected, through the capacitor $\gamma_4$, between the diodes of group $G_4$ the response of which as a function of the voltage $u$ is similar to that of the diodes of group $G_1$.

The collector of the second amplification stage, comprising, in association with the oscillating circuit formed by an inductance and the capacitor $\gamma_5$, the resistor $Rc_2$ between the terminals $S_1$ and $S_2$ from which the output signal is taken off, is connected through the capacity $\gamma_2$, between the two diodes of group $G_2$ the response of which, as a function of the control voltage $u$, is similar to that of the group $G_3$.

In fact, the conductivity of the groups of diodes, when a high positive voltage $u$ is applied thereto, is as follows:

group $G_1$: high conductivity
group $G_2$: low conductivity
group $G_3$: low conductivity
group $G_4$: high conductivity The groups of diodes $G_1$ and $G_3$ are traversed continuously by direct currents $i_1$ and $i_3$ respectively.

If control voltage $u$ having the polarity of FIGURE 7 namely $V_D - V_C = +u$ is applied, it appears that the current $i_1$ will be greater than the current $i_3$, this current $i_3$ not being zero however because $|u|$ is much less than $|E_q|$ by hypothesis.

The effect of attenuation of the signals $e_e$ applied by means of coils $Z_1$ and $Z_2$ to the base of the transistor $T_1$, is accomplished by the shunting of the emitter and of the collector of this transistor between points A and N and the points B and N respectively, by the groups of diodes $G_1$ and $G_3$.

It appears immediately that the effect of this shunting, namely the degree of attenuation, will become lower as the intensity $i_1$ is greater than the intensity $i_3$.

Now according to this invention, it is possible to increase the ratio $i_1/i_3$ by increasing the control voltage $u$, and to do this in a manner practically independent of the temperature.

The resistance variations in the circuits of the respective emitters and collectors of the two transistors $T_1$ and $T_2$, as a function of an increasing voltage $u$, are the following:

|  | Transistor $T_1$ | Transistor $T_2$ |
| --- | --- | --- |
| Resistance of the emitter | Decrease | Decrease. |
| Resistance of the collector | Increase | Increase. |

All of these variations correspond to the increase of the output signal.

Inversely, the decrease of a positive voltage $u$ or the use of progressively more negative values of said voltage $u$ will lead to a decrease of the output signal.

FIGURE 8 shows a further arrangement of a logarithmic attenuator-amplifier according to the invention having a gain the logarithm of which is a linear function of the control voltage. According to this arrangement said linear function may be modified at will.

If the transistors $T_3$ and $T_4$ are omitted, the circuit of FIGURE 8 becomes similar to that of FIGURE 3, except that the command voltage $u$ is divided unequally between groups of diodes $G_1$ and $G_2$ ($u$ and $(1-m)u$ respectively), which makes it possible to modify the variation of the ratio $i_1/i_2$ of the current strengths in the groups of diodes $G_1$ and $G_2$, and hence the degree of attenuation or gain (G) as a function of the command voltage.

This arrangement is similar to that shown in FIGURE 5 except that instead of having the voltage applied between the ends of the chain of diodes divided into two voltages of equal value each of which is applied between the terminals of the groups of diodes, there is applied a voltage $u$ between the terminals of one group of diodes and a voltage $(1-m)u$ between the terminals of the other group of diodes, the total voltage between the ends of the chain of diodes thus being $mu$.

The coefficient $m$ may be adjusted to the desired value by means of the potentiometer P, said coefficient being proportional to the angular coefficient of the straight line representative of the variations of the logarithm of the gain as a function of the control voltage $u$, as is apparent from the following calculation:

The value of the gain is substantially that given by the simplified formula:

$$G = \frac{e_s}{e_e} = \frac{rd_2}{rd_1} = \frac{i_1}{i_2}$$

In view of the relations:

$$rd_1 = \frac{1}{2\beta i_1}, \quad rd_2 = \frac{1}{2\beta i_2}$$

$$i_1 = K_1 e^{\beta/2 u}$$

and $$i_2 = K_2 e^{\beta/2(1-m)u}$$

an approximate value of the gain is the following:

(27)
$$G = \frac{i_1}{i_2} = \frac{K_1}{K_2} e^{\frac{\beta m u}{2}}$$

from which is deduced the equation:

(28)
$$g = LG = L\frac{K_1}{K_2} + \frac{\beta m u}{2}$$

It is apparent from this Equation 28 that the angular coefficient of the straight line representative of $g$ as a function of $u$ $$\left(\text{coefficient } \frac{\beta}{2}m\right)$$

is proportional to the coefficient $m$ which may be chosen at will.

It is also possible to change the origin of said straight line representative of $g$ as a function of $u$ by modifying the gain $G_0$ of the associated amplifier.

According to the arrangement of FIGURE 8 provision is made for two supplementary transistors $T_3$ and $T_4$ acting as an impedance adaptor so as to ensure the proportionality of the voltage $mu$ with the rotation angle of the potentiometer P.

Such an arrangement is of particular interest for use in seismic amplifiers wherein $u$ is a tension variable with time according to a determined law which is the same for all the attenuators used in the seismic amplifiers, and is representative, for instance, of the energy decrease with time of a seismic signal.

The attenuators according to this invention may also be used advantageously in regulated systems wherein modifications of the total gain are not detrimental to the stability of the regulation.

For this purpose there may be used, for instance, two attenuators according to the present invention, controlled by voltages of equal values and opposite signs $+u$ and $-u$ in a feed-back loop of the type shown in FIGURE 9.

FIGURE 9 illustrates a feedback system in which the feedback loop is formed in the classical manner by feeding into a known kind of comparator, such as the differential amplifier $A_d$, the difference between the input signal $e_e$ (measured with reference to a point N at reference potential) and the feedback signal from the output $e_s$ of the system through a reaction chain ($G_B$, $B_O$).

In the feedback system shown, the signal that leaves $A_d$ is applied in an attenuator $G_A$, such as the one shown in the preceding figures, the entrance into $G_A$ of this signal occurring between the terminals of the coil $Z_1$.

The signal furnished by the attenuator $G_A$ between its output terminals B and N is introduced into an amplifier $A_0$ of the classical type, for example, between the control grid of an amplifying tube and the point N, the output signal of this tube constituting likewise that of the feedback system according to this invention.

A feedback loop is formed by applying this output signal $e_s$ between the terminals of coil $Z_1$ of another attenuator $G_B$ according to this invention, followed as in the direct chain ($A_0$, $G_A$) by a classical amplifier $B_O$ of which the output is connected to the differential amplifier $A_d$.

The first of the attenuators $G_A$ and $G_B$ of this application used in this feedback chain is controlled by a control voltage $+u$ and the second by a control voltage $-u$.

In the circuits shown in FIGURES 3 and 5, for example, this signifies that for the first attenuator ($G_A$)

$$V_D - V_N = +\frac{u}{2}$$

and $$V_C - V_N = -\frac{u}{2}$$

or $$V_D - V_C = +u$$

and for the second attenuator ($G_B$)

$$V_D - V_N = -\frac{u}{2}$$

and $$V_C - V_N = +\frac{u}{2}$$

or $$V_D - V_C = -u$$

The respective gains of these two attenuators are the following:

$$G_A = C_a e^{\frac{\beta u}{2n}}$$

$$G_B = C_b e^{-\frac{\beta u}{2n}}$$

$Ao$ and $Bo$ are the gains of the amplifying elements connected with the attenuators and are therefore independent of $u$ and the gain of the open feed-back loop is:

$$Y = Ao \cdot Bo \cdot G_A \cdot G_B = Ao \cdot Bo \cdot Ca \cdot Cb$$

which gain is independent of $u$.

On the contrary, the total gain of the system is:

$$G_r = \frac{e_s}{e_e} = \frac{AoG_A}{1+Y} = \frac{AoC_a e^{\frac{\beta u}{2n}}}{1+AoBoCaCb}$$

Assuming that the term $AoBoCaCb$ is considerably higher than 1, there may be written:

$$G_r = \frac{1}{BoCb} e^{\frac{\beta u}{2n}}$$

from which it is apparent that the total gain varies as an exponential function of $u$ without modification of the gain of the open loop so that the regulation conditions remain stable.

In practical cases, instead of using two voltages of the same absolute value but of opposite sign $+u$ and $-u$, which may be difficult to realize, it will be more convenient to use the same voltage $u$ for controlling the gains $G_A$ and $G_B$ and to inverse the connections of the groups of diodes in one of the two attenuators.

It will be understood that this invention is susceptible to modification in order to adapt it to different usages and conditions and, accordingly, it is desired to comprehend such modifications within this invention as may fall within the scope of the appended claims.

What is claimed as this invention is:

1. In a transfer quadripole an attenuating element with three terminals, substantially insensitive to temperature variations, of which the degree of attenuation is controlled by an adjustable control potential difference, comprising a neutral point at a reference potential, at least one chain of two associated groups each consisting of $2n$ diodes connected in series with the same orientation in each group, $n$ being an integer, the two associated groups of diodes of a chain having a common terminal and two non-common terminals being all at the same alternating potential as said neutral point and being so associated that the orientation of the diodes in one of said two groups is opposite to the orientation of the diodes in the other group with respect to said common terminal, one direct current source associated to each chain of diodes having two terminals, a first of said terminals being connected to said neutral point and a resistor connecting the second of said terminals to the common terminal of the two groups of diodes of said chain whereby said two groups of diodes are permanently fed by direct currents, a control voltage source producing a control potential difference distributed in two fractions each applied respectively between one non-common terminal of a group of diodes and a point at the same alternating potential as the neutral point, the three terminals of the attenuator element comprising a first terminal at the same alternating potential as the neutral point, a second terminal at the same alternating potential as a junction point between the $n$th and $n+1$th diode of a group reckoning from one terminal of said group and a third terminal at the same alternating potential as a junction point between the $n$th and $n+1$th diode of another group, reckoning from one terminal of said group.

2. A three-pole attenuating element according to claim 1, wherein the two fractions of the control potential difference applied between the terminals of the two groups of diodes are of equal absolute value and of opposite signs.

3. An attenuator-amplifier, with two input terminals and two output terminals, substantially insensitive to temperature variations, the attenuation degree of which is controlled by variable control voltage means and comprising, in combination;

(a) at least one attenuating element having a neutral point at a reference potential and comprising at least one chain of two associated groups each consisting of $2n$ diode connected in series with the same orientation in each group, $n$ being an integer, the two associated groups of diodes of a chain having a common terminal and two non-common terminals being all at the same alternating potential as said neutral point and being so associated that the orientation of the diodes in one of said two groups is opposite to the orientation of the diodes in the other group with respect to said common terminal, one direct current source associated to each chain of diodes having two terminals, a first of said terminals being connected to said neutral point and a resistor connecting the second of said terminals to the common terminal of the two groups of diodes of said chain whereby said two groups of diodes are permanently fed by direct currents, a control voltage source producing a control potential difference distributed in two fractions each applied respectively between one non-common terminal of a group of diodes and a point at the same alternating potential as the neutral point; and (b) at least one transistor having a base, an emitter and a collector, said emitter being connected through condenser means to a point of one of said groups of $2n$ diodes, at the junction between the $n$th and the $n+1$th diode, reckoning from one terminal of said group of diodes, said collector being connected through condenser means to a point of another group of $2n$ diodes at the junction between the $n$th and the $n+1$th diode, reckoning from one terminal of said other group of diodes, the emitter and the collector of each transistor being connected respectively to terminals of opposite polarities of current source means, the two input terminals of said attenuator amplifier being respectively, a point connected to the base of one transistor and a point at said reference potential, and the two output terminals of said attenuator amplifier being respectively a point connected to the collector of one transistor and a point at said reference potential.

4. An attenuator-amplifier, with two input terminals and two output terminals, substantially insensitive to temperature variations, the attention degree of which is controlled by variable control voltage means and comprising, in combination;

(a) at least one attenuating element having a neutral point at a reference potential and comprising at least one chain of two associated groups each consisting of $2n$ diodes connected in series with the same orientation in each group, $n$ being an integer, the two associated groups of diodes of a chain having a common terminal and two non-common terminals being all at the same alternating potential as said neutral point and being so associated that the orientation of the diodes in one of said two groups is opposite to the orientation of the diodes in the other group with respect to said common terminal, one direct current source associated to each chain of diodes having two terminals, a first of said terminals being connected to said neutral point and a resistor connecting the second of said terminals to the common terminal of the two groups of diodes of said chain whereby said two groups of diodes are permanently fed by direct currents, a control voltage source producing a control potential difference distributed in two fractions each applied respectively between one non-common terminal of a group of diodes and a point at the same alternating potential as the neutral point; and (b) at least one vacuum tube having a grid, a cathode and an anode, said cathode being connected through condenser means to a point of one of said groups of $2n$ diodes, at the junction between the $n$th and the $n+1$th diode, reckoning from one terminal of said group of diodes, said anode being connected through condenser means to a point of another group of $2n$ diodes at the junction between the $n$th and the $n+1$th diode reckoning from one terminal of said other group of diodes, the cathode and the anode of each vacuum tube being connected respectively to terminals of opposite polarities of current source means, the two input terminals of said attenuator amplifier being respectively a point connected to the grid of one vacuum tube and a point at said reference potential, and the two output terminals of said attenuator amplifier being respectively a point connected to the anode of one vacuum tube and a point at said reference potential.

5. An attenuator-amplifier, with two input terminals and two output terminals, substantially insensitive to temperature variations, the attenuation degree of which is controlled by variable control voltage means and comprising, in combination:

(a) a least one attenuating element having a neutral point at a reference potential and comprising at least one chain of two associated groups each consisting of $2n$ diodes connected in series with the same orientation in each group, $n$ being an integer, the two associated groups of diodes of a chain having a common terminal and two non-common terminals being all at the same alternating potential as said neutral point and being so associated that the orientation of the diodes in one of said two groups is opposite to the orientation of the diodes in the other group with respect to said common terminal, one direct current source associated to each chain of diodes having two terminals, a first of said terminals being connected to said neutral point, and a resistor connecting the second of said terminals to the common terminal of the two groups of diodes of said chain whereby said two groups of diodes are permanently fed by direct currents, a control voltage source producing a control potential difference distributed in two fractions of equal absolute values and of opposite signs, each applied respectively between one non-common terminal of a group of diodes and a point at the same alternating potential as the neutral point; and (b) at least one transistor having a base, an emitter and a collector, said emitter being connected through capacitor means to a point of one of said groups of $2n$ diodes, at the junction between the $n$th and the $n+1$th diode, reckoning from one terminal of said group of diodes, said collector being connected through capacitor means to a point of another group of $2n$ diodes at the junction between the $n$th and the $n+1$th diode, reckoning from one terminal of said other group of diodes, the emitter and the collector of each transistor being connected respectively to terminals of opposite polarities of current source means, the two input terminals of said attenuator-amplifier being respectively, a point connected to the base of one transistor and a point at said reference potential, and the two output terminals of said attenuator-amplifier being respectively a point connected to the collector of one transistor and a point at said reference potential.

6. In a transfer quadripole, an attenuator element with three terminals, substantially insensitive to temperature variations of which the degree of attenuation is controlled by an adjustable control potential difference, comprising a neutral point at a reference potential, one chain of two associated groups each consisting of $2n$ diodes connected in series with the same orientation in each group, $n$ being an integer, the two associated groups of diodes of the chain having a common terminal and two non-common terminals being all at the same alternating potential as said neutral point and being so associated that the orientation of the diodes in one of said two groups is opposite to the orientation of the diodes in the other group with respect to said common terminal, one direct current source having two terminals one of which is directly connected to said neutral point and the other through a resistor to the common terminal of the two groups of diodes, whereby said two groups of diodes are permanently fed by direct currents, a control voltage source producing a control potential difference distributed in two fractions each applied respectively between one non-common terminal of one group of diodes and a point at the same alternating potential as the neutral point, the three terminals of the attenuator element comprising a first terminal at the same alternating potential as the neutral point, a second terminal at the same alternating potential as a junction point between the $n$th and the $n+1$th diode of one group reckoning from one terminal of said group and a third terminal at the same alternating potential as a junction point between the $n$th and $n+1$th diode of the other group, reckoning from one terminal of said other group.

7. An attenuator-amplifier element substantially insensitive to temperature variations, the attenuation degree of which is controlled by variable voltage means and comprising, in combination;
   (a) a first and a second attenuating element each having a neutral point at a common reference potential and comprising respectively a first and second chain of two groups each consisting of $2n$ diodes connected in series with the same orientation in each group, $n$ being an integer, each chain having two terminals and the two groups of diodes of said chain having a common terminal and two non-common terminals consisting of said two terminals of the chain, all the terminals of said two groups being at the same alternating potential as said neutral point, and the groups of diodes being so associated that the orientation of the diodes in one of said two groups is opposite to the orientation of the diodes in the other group with respect to said common terminal, each attenuating element further comprising one direct current source associated to the chain of diodes and having two terminals, a first of said terminals being connected to said neutral point and a resistor connecting the second of said terminals to the common terminal of the two groups of diodes of said chain, whereby said two groups of diodes are permanently fed by direct currents, a control voltage source producing a control potential difference applied between the terminals of the chain of each of said two attenuating elements, a line connecting each terminal of one chain to a separate terminal of the other chain so that the orientation of the diodes adjacent respectively to the connected terminals are opposite with respect to a point of the connecting line; and
   (b) at least one transistor having a base, an emitter and a collector, said emitter being connected through capacitor means to a point of a group of diodes of said first chain at the junction between the $n$th and the $n+1$th diode reckoning from one terminal of said group of diodes, said collector being connected through capacitor means to a point of that group of diodes of said second chain which is directly connected to said group of said first chain through said connecting line, the emitter and the collector of each transistor being connected respectively to terminals of opposite polarities of current source means, the two input terminals of said attenuator-amplifier being respectively a point connected to the base of one transistor and a point at said reference potential, and the two output terminals of said attenuator-amplifier being respectively a point connected to the collector of one transistor and a point at said reference potential.

8. An attenuator-amplifier element substantially insensitive to temperature variations, the attenuation degree of which is controlled by variable voltage means and comprising, in combination;
   (a) a first and a second attenuating element, each having a neutral point at a common reference potential and comprising respectively first and second chains of two groups each consisting of $2n$ diodes connected in series with the same orientation in each group, $n$ being an integer, each chain having two terminals and the two groups of diodes of said chain having a common terminal and two non-common terminals consisting of said two terminals of the chain, all the terminals of said two groups being at the same alternating potential as said neutral point, and the group of diodes being so associated that the orientation of the diodes in one of said two groups is opposite to the orientation of the diodes in the other group with respect to said common terminal, each attenuating element further comprising one direct current source associated to the chain of diodes and having two terminals, a first of said terminals being connected to said neutral point and a resistor connecting the second of said terminals to the common terminals of the two groups of diodes of said chain, whereby said two groups of diodes are permanently fed by direct currents, a control voltage source producing a control potential difference applied between the terminals of the chain of each of said two attenuating elements, a line connecting each terminal of one chain to a separate terminal of the other chain so that the orientation of the diodes adjacent respectively to the connected terminals are opposite with respect to a point of the connecting line;
   (b) a first transistor having a base, an emitter and a collector, said emitter being connected through capacitor means to a point of a first group of diodes of the first chain at the junction between the $n$th and the $n+1$th diode, reckoning from one terminal of said group of diodes, said collector being connected through capacitor means to a point at the junction between the $n$th and the $n+1$th diode of a first group of diodes of the second chain, which is that one directly connected to said group of said first chain through said connecting line, reckoning from one terminal of said group, the emitter and the collector of said first transistor being connected to terminals of opposite polarities of current source means; and
   (c) a second transistor having a base, an emitter and a collector, said emitter being connected through capacitor means to a point of the second group of diodes of said second chain at the junction between the $n$th and the $n+1$th diode, reckoning from one terminal of said chain, said collector being connected through capacitor means to a point of the second group of diodes of the first chain at the junction between the $n$th and the $n+1$th diode reckoning from one terminal of said first chain, the emitter and the collector of said second transistor being connected to terminals of opposite polarities of current source means, the collector of said first transistor being connected to the base of said second transistor, the two input terminals of said attenuator-amplifier being respectively a point connected to the base of said first transistor and a point at the same alternating potential as said neutral point, and the two output terminals of said attenuator-amplifier being respectively a point on the collector of said second transistor and a point at the same alternating potential as the neutral point.

9. An attenuator-amplifier, with two input terminals and two output terminals, substantially insensitive to temperature variations, the attenuation degree of which is controlled by variable control voltage means and comprising, in combination;

(a) an attenuating element having a neutral point at a reference potential, one chain of two associated groups each consisting of $2n$ diodes connected in series with the same orientation in each group, $n$ being an integer, the two associated groups of diodes of the chain having a common terminal and two non-common terminals being all at the same alternating potential as said neutral point and being so associated that the orientation of the diodes in one of said two groups is opposite to the orientation of the diodes in the other group with respect to said common terminal, one direct current source, having two terminals, a first of said terminals being connected to said neutral point, and a resistor connecting the second of said terminals to the common terminal of the two groups of diodes of said chain, whereby said two groups of diodes are permanently fed by direct currents, a control voltage source producing a control potential difference distributed in two unequal fractions, each applied respectively between one non-common terminal of a group of diodes and a point at the same alternating potential as the neutral point, potentiometer means for varying the ratio of said two unequal fractions; and (b) One transistor having a base, an emitter and a collector, said emitter being connected through capacitor means to a point of one of said groups of $2n$ diodes, at the junction between the $n$th and the $n+1$th diode, reckoning from one terminal of said group of diodes, said collector being connected through capacitor means to a point of another group of $2n$ diodes at the junction between the $n$th and the $n+1$th diode, reckoning from one terminal of said other group of diodes, the emitter and the collector of said transistor being connected respectively to terminals of opposite polarities of current source means, the two input terminals of said attenuator-amplifier being respectively a point connected to the base of said transistor and a point at said reference potential, and the two output terminals of said attenuator-amplifier being respectively a point connected to the collector of said transistor and a point at said reference potential.

10. In a feedback system having a direct path and a backward path, an input and an output, comprising two amplifying elements each having an input and an output, and a differential amplifier having two inputs and an output, the combination of two attenuating elements according to claim 1, each having an input and an output, wherein one attenuating element having its input connected to the output of said differential amplifier has its output connected to the input of a first amplifying element, forming therewith the direct path of the feed-back system, the output of said first amplifying element being connected to the input of the other attenuating element, the output of which is in turn connected to the input of a second amplifying element forming therewith the backward path of the feed-back system, the output of said second amplifying element being connected to a first input of said differential amplifier, and means for applying control potential differences of equal absolute values but opposite in signs respectively to a separate one of said two attenuating elements, so as to vary the gains of said attenuating elements in reverse relation to each other, the input of said feedback system being the second input of said diffeerntial amplifier and the output of the feedback system being the output of said first amplifying element.

11. In a feedback system having a direct path and a backward path, an input and an output, comprising two amplifying elements each having an input and an output and a differential amplifier having two inputs and an output, the combination of two attenuating elements according to claim 1, each having an input and an output, wherein one attenuating element having its input connected to the output of said differential amplifier has its output connected to the input of a first amplifying element, forming therewith the direct path of the feedback system, the output of said first amplifying element being connected to the input of the other attenuating element, the output of which is in turn connected to the input of a second amplifying element forming therewith the backward path of the feedback system, the output of said second amplifying element being connected to a first input of said differential amplifier, said attenuating elements having their gains controlled by means of the same voltage and being so arranged that the product of their respective gains remains constant when said control voltage varies.

References Cited by the Examiner

UNITED STATES PATENTS 2,618,753   11/1952   Van Mierlo _____ 307—88.5

ROY LAKE, *Primary Examiner.*

JOHN KOMINSKI, *Examiner.*